United States Patent
Oiwa et al.

(10) Patent No.: US 10,722,795 B2
(45) Date of Patent: Jul. 28, 2020

(54) STORAGE MEDIUM, INFORMATION PROCESSING APPARATUS AND INFORMATION PROCESSING METHOD

(71) Applicant: NINTENDO CO., LTD., Kyoto (JP)

(72) Inventors: Ryota Oiwa, Kyoto (JP); Yuki Tsukahara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 159 days.

(21) Appl. No.: 15/672,645

(22) Filed: Aug. 9, 2017

(65) Prior Publication Data
US 2018/0154258 A1 Jun. 7, 2018

(30) Foreign Application Priority Data

Dec. 7, 2016 (JP) .................................. 2016-237235

(51) Int. Cl.
| A63F 13/00 | (2014.01) |
| A63F 13/49 | (2014.01) |
| A63F 13/26 | (2014.01) |
| A63F 13/5252 | (2014.01) |

(52) U.S. Cl.
CPC .............. *A63F 13/49* (2014.09); *A63F 13/26* (2014.09); *A63F 13/5252* (2014.09); *A63F 2300/203* (2013.01); *A63F 2300/554* (2013.01); *A63F 2300/6669* (2013.01)

(58) Field of Classification Search
None
See application file for complete search history.

(56) References Cited

U.S. PATENT DOCUMENTS

| 6,810,441 B1 * | 10/2004 | Habuto .................. G11B 20/10 |
| | | 348/222.1 |
| 2009/0010485 A1 | 1/2009 | Lamb et al. |
| 2014/0055552 A1 * | 2/2014 | Song ...................... H04N 7/141 |
| | | 348/14.02 |
| 2015/0109507 A1 | 4/2015 | Li et al. |
| 2015/0281325 A1 | 10/2015 | Takaichi et al. |
| 2016/0210107 A1 * | 7/2016 | Takahashi .......... H04N 1/32122 |
| 2017/0036109 A1 | 2/2017 | Matsumoto |

(Continued)

FOREIGN PATENT DOCUMENTS

| JP | 2002-233662 A | 8/2002 |
| JP | 2010-233671 A | 10/2010 |
| JP | 2010-240210 A | 10/2010 |

(Continued)

*Primary Examiner* — Jay Trent Liddle
*Assistant Examiner* — Alex P. Rada, II
(74) *Attorney, Agent, or Firm* — Scully, Scott, Murphy & Presser, P.C.

(57) ABSTRACT

A non-limiting example game apparatus includes a display device, and a game screen is displayed on the display device. A play image including a player character, an enemy character, a ground object, a block object and a clay pipe object, for example is displayed as a game screen. If a capture instruction is input during a game play, image data corresponding to a play image at a time of input is acquired as captured image data. In the game apparatus, a reduced image of a captured image is generated and displayed in a manner superimposed on the play image. During game control processing is performed, processing that generates and displays the reduced image is performed.

17 Claims, 8 Drawing Sheets

(56) References Cited

U.S. PATENT DOCUMENTS

2017/0050112 A1 2/2017 Fukuda et al.
2017/0212670 A1 7/2017 Shimizu

FOREIGN PATENT DOCUMENTS

| JP | 2014-92991 | 5/2014 |
| JP | 2015-531079 A | 10/2015 |
| WO | WO 2015/133032 A1 | 9/2015 |
| WO | WO 2016/017420 A1 | 2/2016 |

\* cited by examiner

STORAGE MEDIUM, INFORMATION PROCESSING APPARATUS AND INFORMATION PROCESSING METHOD

CROSS REFERENCE OF RELATED APPLICATION

The disclosure of the patent application No. 2016-237235 filed on Dec. 7, 2016 is incorporated by reference.

FIELD

This application describes a storage medium, information processing apparatus and information processing method, in which while performing an application, a reduced image of a captured image capturing an application image is generated and the generated reduced image is displayed in a manner superimposed on the application image.

SUMMARY

It is a primary object of an embodiment(s) to provide a novel storage medium, information processing apparatus and information processing method.

Moreover, it is another object of the embodiment(s) to provide a storage medium, information processing apparatus and information processing method, capable of visually confirming a captured image while performing information processing.

A first embodiment is a non-transitory computer-readable storage medium storing an information processing program that is executed by a computer, wherein the information processing program causes one or more processors of the computer to perform steps of: an input receiving step, an information processing step, an application image generating step, an application image acquiring step, a reduced image generating step, and a display controlling step. In the input receiving step, input information indicative of an input by a user is received. In the information processing step, when the input information received in the input receiving step indicates a first input, predetermined information processing in an application according to the input information is performed. In the application image generating step, an application image in accordance with the predetermined information processing is generated. In the application image acquiring step, when the input information received in the input receiving step indicates a second input, the application image generated in the application image generating step is acquired. In the reduced image generating step, a reduced image of the application image acquired in the application image acquiring step is generated. In the display controlling step, the reduced image generated in the reduced image generating step is displayed in a manner superimposed on the application image during the predetermined information processing is performed.

According to the first embodiment, when the second input is received, the reduced image is generated and displayed in a manner superimposed on the application image in parallel to the predetermined information processing, and therefore, it is possible to visually confirm the acquired application image while the information processing is performed immediately after receiving the second input.

A second embodiment is the storage medium according to the first embodiment, wherein in the reduced image generating step, a reduced image is generated by performing first image processing thinning-out pixels from the application image at a rate corresponding to a reduction rate.

According to the second embodiment, the reduced image of the acquired application image can be generated by simple image processing of only thinning-out the pixels.

A third embodiment is the storage medium according to the first embodiment, wherein the information program further causes the one or more processors of the computer to perform an application image saving step. In the application image saving step, the application image acquired in the application image acquiring step is saved in a saving memory.

According to the third embodiment, if processing saving the application image in the saving memory is performed in parallel to the first image processing and the second image processing, for example, it is possible to see the reduced image of the application image without waiting for saving of the application image.

A fourth embodiment is the storage medium according to the third embodiment, wherein in the application image acquiring step, the acquired application image is stored in a temporarily storing memory, and the application image stored in the temporarily storing memory in the application image acquiring step is saved in the saving memory.

According to the fourth embodiment, using the application image stored in the temporarily storing memory, it is possible to generate the reduced image and to save the application image.

A fifth embodiment is the storage medium according to the fourth embodiment, wherein the temporarily storing memory has a storage area configured to store a plurality of application images, and in the application image saving step, when a plurality of application images are stored in the temporarily storing memory, each of the plurality of application images is saved in the saving memory in an order of being stored in the temporarily storing memory.

According to the fifth embodiment, since a plurality of application images are temporarily stored and saved sequentially, the application images can be successively acquired.

A sixth embodiment is the storage medium according to the third embodiment, wherein the information program further causes the one or more processors of the computer to perform a message displaying step. In the message displaying step, an error message is displayed with the reduced image when the application image cannot be saved in the application image saving step.

According to the sixth embodiment, since the error message is displayed with the reduced image when the application image cannot be saved, it is possible to visually confirm easily the application image that cannot be saved.

A seventh embodiment is the storage medium according to the third embodiment, wherein the information program further causes the one or more processors of the computer to perform a compressing step. In the compressing step, the second image processing that compresses the application image acquired in the application image acquiring step with a predetermined format. In the application image saving step, the application image compressed in the compressing step is saved in the saving memory.

According to the seventh embodiment, since the application image is compressed and saved, a memory capacity of the saving memory can be used efficiently.

An eighth embodiment is the storage medium according to the seventh embodiment, wherein the second image processing is more complicated than the first image processing. That is, the reduced image is generated comparatively quickly.

According to the eighth embodiment, the reduced image can be displayed in a short time after the second input is received. Therefore, it is possible to quickly visually confirm whether a desired application image is acquired.

A ninth embodiment is the storage medium according to the seventh embodiment, wherein the first image processing is thinning-out processing and the second image processing is compressing processing.

A tenth embodiment is the storage medium according to the first embodiment, wherein the reduced image is displayed in a manner superimposed on a part of the application image.

According to the tenth embodiment, it is possible to visually confirm the reduced image while performing an operation for an application.

An eleventh embodiment is the storage medium according to the first embodiment, wherein the reduced image is displayed in an upper end portion of the application image.

According to the eleventh embodiment, the reduced image can be displayed in a position not interfering with an operation for an application, for example.

A twelfth embodiment is the storage medium according to the first embodiment, wherein in the application image generating step, the application image including a predetermined object that is at least moved according to the input information is generated, and in the display controlling step, the reduced image is displayed in a position not overlapping with the predetermined object.

According to the twelfth embodiment, since the reduced image is displayed in a position not overlapping with the predetermined object a movement of which is to be operated by the user, the reduced image can be displayed in a position that does not interfere an operation making the predetermined object move.

A thirteenth embodiment is the storage medium according to the first embodiment, wherein the reduced image is temporarily displayed.

According to the thirteenth embodiment, since the reduced image is non-displayed if the acquired application image is visually confirmed, for example, it is possible to shorten a time period that the application image that is being performed cannot be seen due to the reduced image as much as possible.

A fourteenth embodiment is the storage medium according to the first embodiment, wherein the second input is an operation to a push button provided in an operating device. For example, when the push button is operated, the application image is acquired and the reduced image of the acquired application image is generated. The generated reduced image is displayed in a manner superimposed on the application image.

According to the fourteenth embodiment, since the reduced image is displayed in response to an operation of the push button, it is possible to perform a feedback against the operation. Moreover, since the reduced image is displayed, the user can know in a short time whether acquisition of the application image is successful.

A fifteenth embodiment is a non-transitory computer-readable storage medium storing an information processing program that is executable by a computer, wherein the information processing program causes one or more processors of the computer to perform steps of: an application image generating step; an application image acquiring step; a display controlling step; and a saving step. In the application image generating step, an application image is generated according to predetermined information processing in an application. In the application image acquiring step, the application image generated in the application image generating step is acquired in response to receiving a predetermined input. In the display controlling step, a reduced image of the application image acquired in the application image acquiring step is generated and displayed in a manner superimposed on the application image. In the saving step, in parallel to processing in the display controlling step, the application image acquired in the application image acquiring step is saved in a saving memory through data conversion thereof.

According to the fifteenth embodiment, when receiving the predetermined input, in parallel to generating and displaying of the reduced image, the application image is saved, and the reduced image is displayed without waiting for saving of the application image, and therefore, it is possible to visually confirm the acquired application image immediately after receiving the predetermined input.

A sixteenth embodiment is an information processing apparatus, comprising: an input receiving portion configured to receive input information indicative of an input by a user; an information processing portion configured to perform, when the input information received by the input receiving portion indicates a first input, predetermined information processing in an application according to the input information; an application image generating portion configured to generate an application image in accordance with the predetermined information processing; an application image acquiring portion configured to acquire, when the input information received in the input receiving portion indicates a second input, the application image generated by the application image generating portion; a reduced image generating portion configured to generate a reduced image of the application image acquired by the application image acquiring portion; and a display controlling portion configured to display the reduced image generated by the reduced image generating portion in a manner superimposed on the application image during the predetermined information processing is performed.

A seventeenth embodiment is an information processing method, comprising steps of: (a) receiving input information indicative of an input by a user; (b) performing, when the input information received in the step (a) indicates a first input, predetermined information processing in an application according to the input information concerned; (c) generating an application image in accordance with the predetermined information processing; (d) acquiring, when the input information received in the step (a) indicates a second input, the application image generated in the step (c), (e) generating a reduced image of the application image acquired in the step (d); and (f) displaying the reduced image generated in the step (e) in a manner superimposed on the application image during the predetermined information processing is performed.

According to the sixteenth and seventeenth embodiments, as similar to the first embodiment, it is possible to visually confirm the acquired application image while the information processing is performed immediately after receiving the second input.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
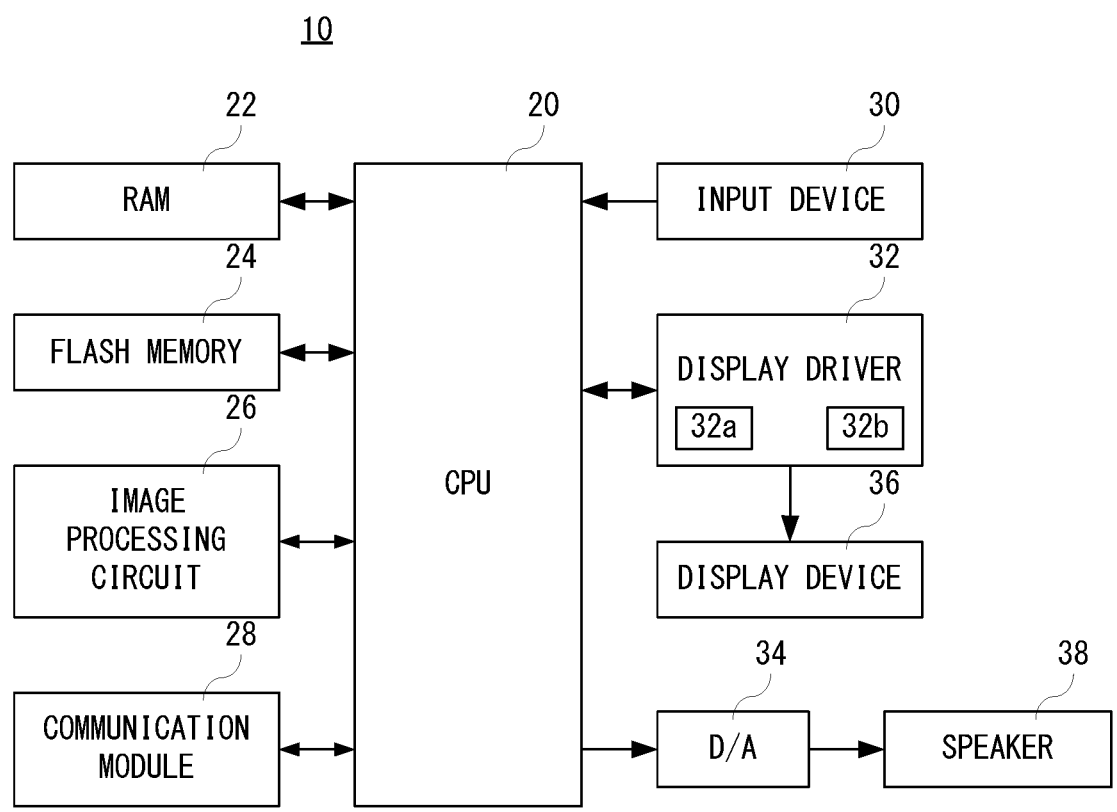
FIG. 1 is a block diagram showing non-limiting example electric structure of a game apparatus.

With referring to FIG. 1, a non-limiting example game apparatus 10 includes a CPU 20, and the CPU 20 is connected with a RAM 22, a flash memory 24, an image processing circuit 26, a communication module 28, an input device 30, a display driver 32 and a D/A converter 34. A display device 36 is connected with the display driver 32, and a speaker 38 is connected with the D/A converter 34.

Although the game apparatus 10 of this embodiment is a portable information processing apparatus, it does not need to be limited to a game dedicated machine, a portable terminal having a game function may be used. A typical example of the portable terminal having a game function is a feature phone, a smartphone and a tablet PC. Moreover, it does not need to be limited to the portable game apparatus 10, and the present embodiment is applicable also to a stationary game apparatus 10 or an arcade game apparatus. Therefore, the present embodiment is applicable to a general-purpose PC having a game function.

The CPU 20 is in charge of overall control of the game apparatus 10. The RAM 22 is a volatile memory, and is used as a working memory and a buffer memory for the CPU 20. The flash memory 24 is a nonvolatile memory, and is used in order to store an application (information processing) program such as a game application and to store (save) various kinds of data.

However, there is no necessity that an application is limited to a game application, various kinds of application such as a document production application, an email application, a painting application, character or letter practice application, a linguistic training application, a learning application, etc. correspond.

The image processing circuit 26 is a circuit for performing predetermined image processing on an image capturing a game screen 100 (game image) (hereinafter, called "captured image"). The predetermined image processing is processing of YUV conversion, gamma correction, color correction, and so on.

In addition, although omitted in this first embodiment, the game apparatus 10 includes the image processing circuit 26, and further may be provided with an imaging device comprising a lens and an imaging device (image sensor) using an image element such as a CCD or a CMOS. In this case, image data (imaged image data) that converts an imaged image obtained with the image sensor through the lens into digital data is input to the image processing circuit 26, and the above-described predetermined image processing is performed onto the image data.

The communication module 28 has a function to access a wireless LAN according to the standard of IEEE802.11.b/g, for example. Therefore, the CPU 20 transmits or receives data to or from other equipment (computers, other game apparatuses 10, etc.) via an access point and Internet (network) with using the communication module 28, for example. However, it is also possible to transmit or receive data to or from other equipment directly with using the first communication module 26.

Alternately, the communication module 28 has a function to perform short-distance wireless communication. Specifically, the communication module 28 has a function to transmit or receive an infrared signal to or from other equipment (other game apparatuses etc.) with a predetermined communication system (infrared system, for example), and a function to perform wireless communication between the same or similar kind of game apparatus according to a predetermined communication protocol (multilink protocol, for example). Therefore, the CPU 20 can transmit or receive data to or from the same or similar kind of other game apparatuses directly with using the communication module 28, for example. However, instead of the short-distance wireless communication of an infrared system, short-distance wireless communication according to other wireless-communication standards such as Bluetooth (registered trademark) may be performed.

The input devices 30 are various kinds of push buttons or switches that are provided on the game apparatus 10, for example, and are used by the user for various kinds of operations such as menu selection, a game operation and a capture (imaging) instruction. However, as the input device 30, instead of the push buttons or switches, or together with the push buttons or switches, input portion such as a pointing devices (a touch panel etc., for example), a microphone, a camera, etc. may be provided. Furthermore, the touch panel may be built into a display 36 described later. The display 36 in this case is a touch panel integral type display.

The display driver 32 is incorporated with a GPU 32a and a video RAM (VRAM) 32b, and under instructions of the CPU 20, the GPU 32a draws (generates) image data corresponding to various kinds of images such as a game image on the VRAM 32b, and outputs the generated image data to the display 36. Therefore, various kinds of images can be displayed on the display 36.

The D/A converter 34 converts sound data applied from the CPU 20 into an analog game sound, and outputs the same to the speaker 38. In addition, the game sound means is a sound signal corresponding to a sound required for the game, such as an imitation sound of a game character or object, sound effect and music (BGM).

Figure 2:
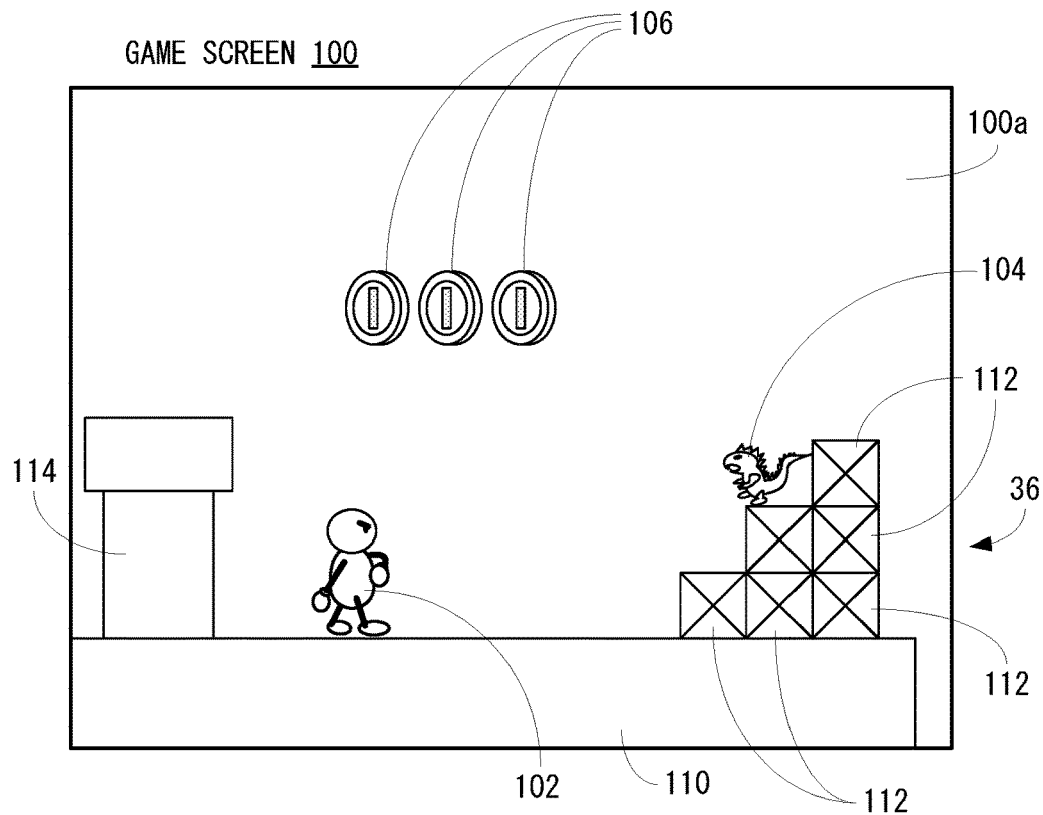
FIG. 2 is an illustration view showing a non-limiting first example game screen displayed on a display device shown in FIG. 1.

In addition, the electric structure of the game apparatus 10 shown in FIG. 2 is a mere example, and it does not need to be limited to this. For example, the communication module 28 may be dispensed with. Moreover, an external memory such as an SD card and a memory stick may be provided attachably and detachably. In this case, the flash memory 24 may be omitted.

A non-limiting example game screen 100 shown in FIG. 2 is an image that a part of a virtual course provided in a virtual game space is imaged with a virtual camera in a virtual game (application image). A player character 102 and an enemy character 104 are displayed in this game screen 100. Moreover, a coin object 106 is displayed in the game screen 100. In an example shown in FIG. 2, the player character 102 is located on a ground object 110, and three coin objects 106 are arranged above this player character 102. Moreover, the enemy character 104 is located on a plurality of block objects 112 stacked in stairs. Moreover, a clay pipe object 114 is provided to be pierced in the ground object 110.

Hereinafter, in order to distinguish from a game screen 100 including a reduced image 150 and a message image 152 both described later, an image that is displayed as a game screen 100 that does not include the reduced image 150 and the message image 152 as shown in FIG. 2 may be called a "play image 100a." That is, in the example shown in FIG. 2, the play image 100a is an image including the player character 102, the enemy character 104, the coin objects 106, the ground object 110, the block objects 112, the clay pipe object 114 and a blank background image.

For example, this game is an action adventure game of horizontal scrolling, and the player character 102 performs arbitrary actions of moving in the virtual course, jumping, acquiring items such as the coin object 106, stomping the enemy character 104, etc. according to an operation of a player.

When the player character 102 reaches a goal that is set in a course within a time limit, the course is cleared. Moreover, the game is cleared if all the courses are cleared. However, if the player character 102 is attacked by the enemy character 104 or protrudes from the course, a mistake is made and the number of remaining lives of the player character 102 is decremented by 1 (one). Moreover, when the number of remaining lives becomes 0 (zero), the game is over.

If a capture (imaging) instruction is input by the player with using the input device 30 during a game play, in the game apparatus 10, a game screen 100 at a time that the capture instruction is input is captured (imaged). A captured image (screenshot) can be viewed, in the game application that is being played or in another application, for example. Moreover, data of the captured image can be transmitted while being attached to an email, and can be uploaded to a predetermined Web page. However, in this embodiment, what is captured is only the play image 100a, and the reduced image 150 and the message image 152 are not included.

In addition, in this embodiment, a capture instruction is input by operating a predetermined push button or switch of the input device 30. However, a capture instruction may be input by using input means such as a microphone, a camera and the like. For example, a capture instruction is input in response that a voice "imaging" is input from the microphone. Moreover, a capture instruction is input in response to that a predetermined image, a predetermined pause or a predetermined gesture is imaged by a camera that is an input means.

Moreover, when providing an inertia sensor (an acceleration sensor, a gyro sensor, etc.) on the game apparatus 10, a capture instruction may be input in response to that a posture or movement of the game apparatus 10 indicates a predetermined posture or movement.

Moreover, when a capture instruction is input, image processing (first image processing) that generates a reduced image from an image that the game screen 100 is captured is performed. For example, the first image processing generates image data of the reduced image 150 that an image being captured (captured image) is reduced by developing (writing) the captured image in the VRAM 32b while thinning-out some pixels of the image data of the captured image by the GPU 32a under instructions of the CPU 20. However, when generating the reduced image 150, pixels of the number that corresponds to a reduction rate are thinned-out from the captured image. For example, when the captured image is to be reduced to a size of 1/10, pixels are read by skipping every nine (9) pixels for each of vertical and horizontal.

In addition, in the drawings (FIG. 3-FIG. 5), in order to show the reduced image 150 intelligibly, the reduced image is represented in a size of 1/4 of the captured image (game screen 100).

Figure 3:
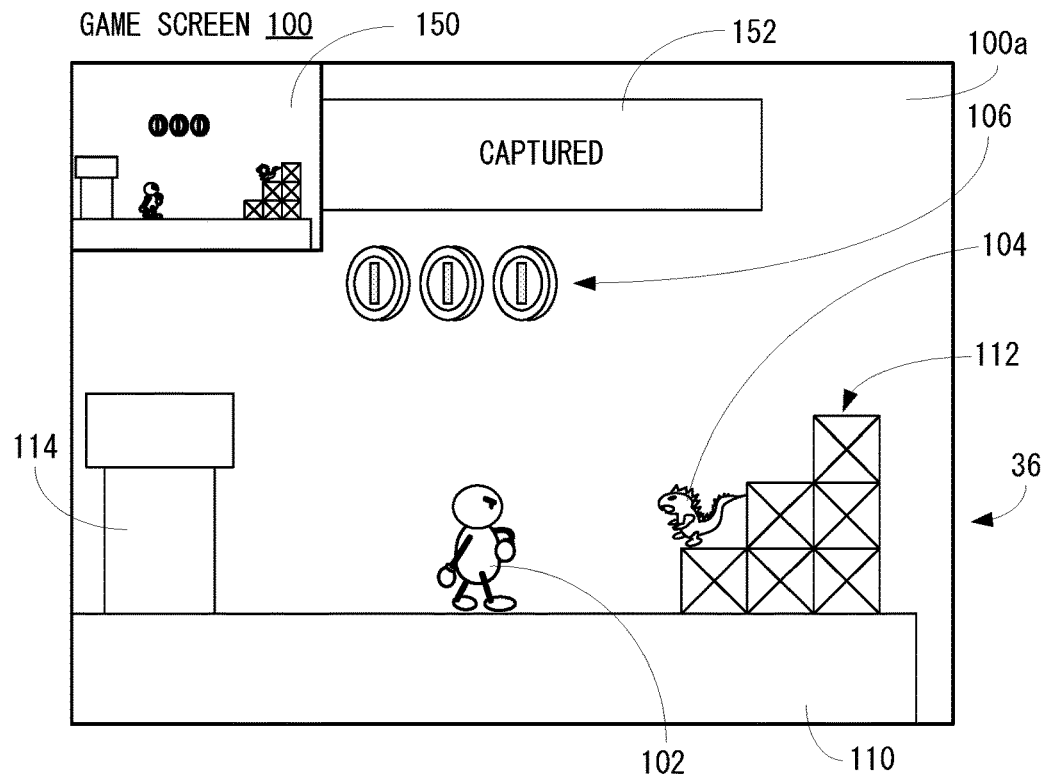
FIG. 3 is an illustration view showing a non-limiting second example game screen displayed on the display device shown in FIG. 1.

If the reduced image 150 is generated, as shown in the game screen 100 of FIG. 3, the generated reduced image 150 is displayed on the display device 36 in a manner superimposed on the play image 100a. As shown also in FIG. 3, the reduced image 150 is displayed in an upper left portion of the game screen 100, and is displayed on the front of the play image 100a. That is, the reduced image 150 is displayed in an upper portion of the game screen 100 (display device 36). Moreover, the message image 152 is displayed in a top center of the game screen 100, and is displayed on the front of the play image 100a. That is, the game screen 100 that the reduced image 150 and the message image 152 are superimposed on the play image 100a is displayed on the display device 36. In the message image 152 of the game screen 100 shown in FIG. 3, a message indicating that the game screen 100 is captured (imaged) is described within a quadrangular display frame.

A reason why the reduced image 150 and the message image 152 are displayed in an upper portion of the game screen 100 (display device 36) is that in most cases in a normal game, the ground is displayed in a lower portion of the game screen 100 and the player character 102 is displayed on the ground. That is, it is for preventing the player character 102 from being hidden by the reduced image 150 and the message image 152.

Therefore, in applications other than a game, the reduced image 150 and the message image 152 are displayed in a position not overlapping with an object that the user operates. Accordingly, depending on the kind of a game or other applications, the reduced image 150 and the message image 152 may be displayed in a position other than the upper portion of the screen.

In addition, although illustration is omitted, when the player inputs a capture instruction in a scene that is not permitted to capture (image) the game screen 100, the message image 152 that a message indicating that the capture is not permitted (imaging prohibiting message) is described is displayed in a top center of the game screen 100. In this case, an image indicating that the capture is not permitted may be displayed on an upper left portion of the game screen 100, i.e., a left side of the message image 152.

However, a scene that the capture of the game screen 100 is not permitted is decided (set) in advance by the developer etc. of the game.

Moreover, when a captured image is acquired according to a capture instruction of the player, in the game apparatus 10, a captured image is saved in the flash memory 24 in parallel to the above-described generating and displaying of the reduced image 150. However, the captured image may be saved in an external memory. In this embodiment, an upper limit of the number of captured images (the number of sheets) capable of being saved is set so as not to press a memory capacity of the flash memory 24. Moreover, an image file according to a predetermined format such as a JPEG format can be generated from the captured image. Producing an image file of a general-purpose data format in such a manner is for easily handling the same even by a computer other than the game apparatus 10. For example, a general-purpose data format means a data format that can be used in various types of application programs and a data format that can be used in various kinds of hardware. Therefore, an image file of other data format such as PNG, GIF or BMP may be generated.

Thus, in the game apparatus 10 of this embodiment, first processing that performs generating and displaying of the reduced image 150 and second processing that performs generating and saving of the image data (image file) of JPEG are performed in parallel to each other.

A reason why the first processing and the second processing are performed in parallel is that it takes a time required to perform the second processing until the reduced image 150 is displayed after receiving the capture instruction if the first processing is performed after the second processing is performed. For example, when generating a JPEG image file from a captured image, it is necessary for the CPU 20 (1) to perform DCT conversion, (2) to quantize data, (3) to arrange DCT-converted data in one line, and (4) to perform entropy coding (compression) of data that is arranged in one line, a process is complicated, and it takes time. Moreover, in also saving (writing) the image file into the flash memory 24, it is necessary to repeatedly perform read and write processing that reads partial data of the image file that is stored (generated) in the RAM 22 and writes the read partial data into the flash memory 24, it takes time.

Therefore, since the player cannot visually confirm the captured image at a time of an input of a capture instruction, it is impossible to know immediately whether the capture instruction is input correctly. Moreover, it is also impossible to know immediately whether a desired captured image is acquired.

In addition, in order to avoid this, it is conceivable to display the captured image on the display device 36 as it is, but in that case, since the captured image covers the game screen 100, there is inconvenience that the player cannot see the game screen 100. Moreover, it is also conceivable to display the captured image separately the game screen 100 by providing two display devices 36 or by dividing a display area of the display device 36 into two areas, but in such cases, it is difficult to see the captured image and the game screen 100, and therefore, there is inconvenience that it takes a miss in the game operation.

Figure 4:
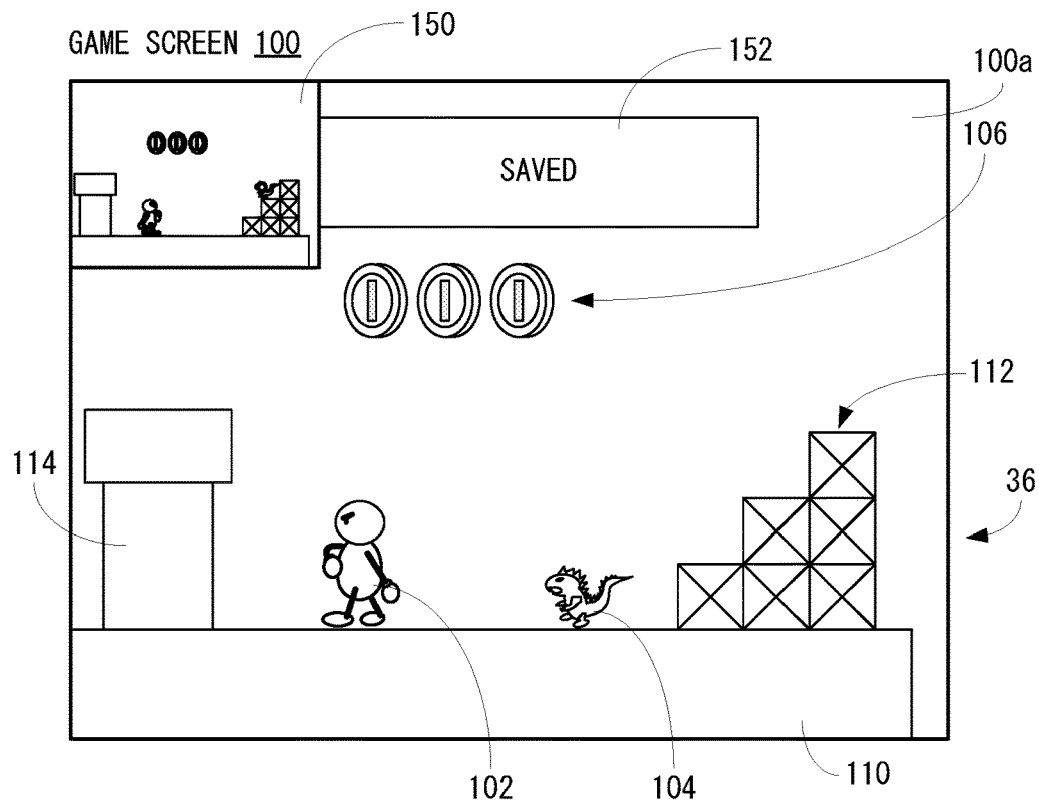
FIG. 4 is an illustration view showing a non-limiting third example game screen displayed on the display device shown in FIG. 1.

Therefore, in this embodiment, the first processing and the second processing are performed in parallel so that the game screen 100 that the reduced image 150 generated in a comparatively short time is superimposed on a portion of the play image 100a is displayed. That is, the reduced image 150 can be displayed in response to an input of a capture instruction. Thus, a feedback is performed to the capture instruction in a comparatively short time. Moreover, if the image file that the captured image is converted into a JPEG format is saved in the flash memory 24, for example, the message image 152 described with a message indicating that the captured image is saved is displayed. For example, as shown in FIG. 4, the message image 152 described with "saved" is displayed beside the reduced image 150.

Moreover, as shown in the game screen 100 of FIG. 3, from a state shown in FIG. 2, the player character 102 is moved rightward and the enemy character 104 is moved leftward. Moreover, as shown in the game screen 100 of FIG. 4, from the state shown in FIG. 3, the player character 102 is moved leftward and the enemy character 104 is also moved toward a left side of the block object 112. This is because game controlling processing is continuously performed even when the first processing and the second processing are performed. That is, the first processing and the second processing are performed in parallel during the game controlling processing is performed.

However, the game controlling processing includes controlling processing of the player character 102 according to an operation of the player and further processing. The controlling processing of the player character 102 causes the player character 102 to move, causes the player character 102 to attack the enemy character 104, or causes the player character 102 to acquire or use an item 202. Moreover, the further processing controls of a movement and motion of the enemy character1 104, determines a game clear or game over, makes an item appear, etc. These are the same in the game screen 100 shown in FIG. 5.

Even when the game screen 100 can be imaged, the captured image may not be saved in the flash memory 24 due to an upper limit of the number of stored captured images and the insufficient memory capacity. Moreover, when the image file is to be saved in the flash memory 24, data may fail to be written.

When such a situation occurs, the message image 152 described with a message indicating that the captured image acquired this time cannot be save is displayed. Moreover, at this time, on the front of the reduced image 150, an image (in this embodiment, x mark) 160 indicating that the reduced image cannot be saved is displayed. However, the image 160 does not need to be displayed.

Figure 5:
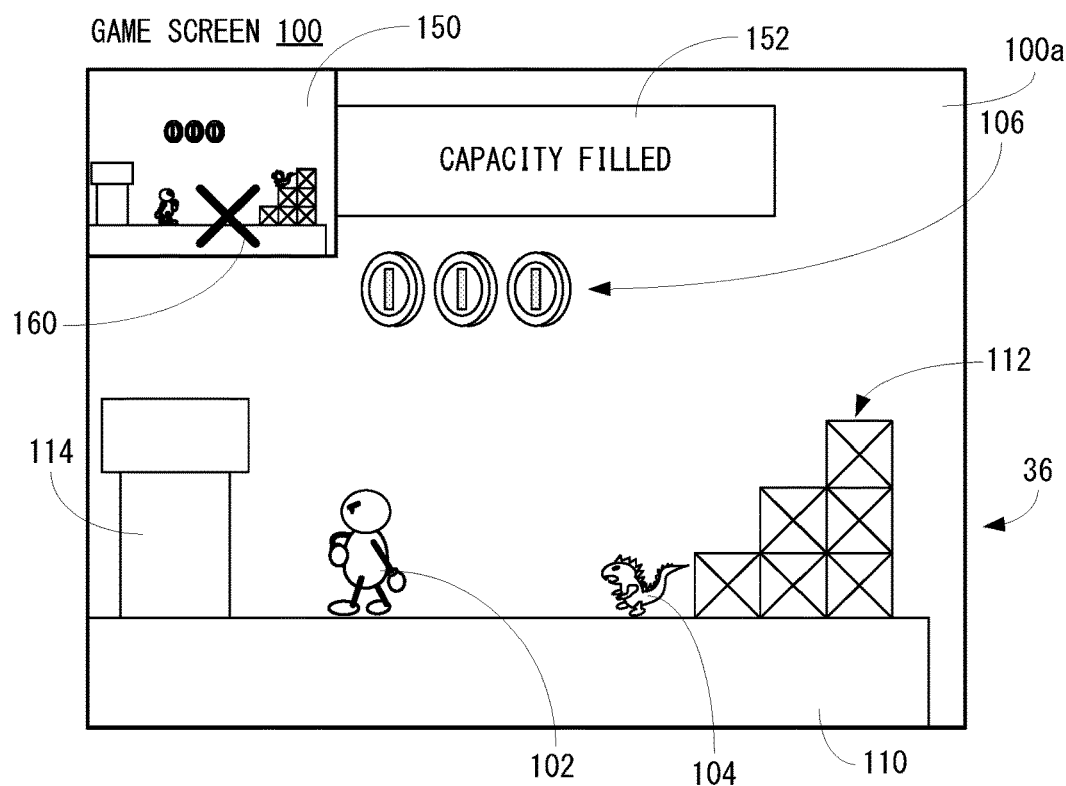
FIG. 5 is an illustration view showing a non-limiting fourth example game screen displayed on the display device shown in FIG. 1.

However, in this embodiment, the content of the message is changed according to a cause incapable of saving. For example, when the number of saved sheets of the capture image reaches its upper limit, the message image 152 described with a message such as "screen photos are full" may be displayed beside the reduced image 150. Moreover, when the memory capacity of the flash memory 24 is insufficient, as shown in FIG. 5, a message such as "capacity filled" is described in the message image 152. Furthermore, when the writing of the data to the flash memory 24 is failure, a message such as "couldn't save" is described in the message image 152. Thus, when the captured image cannot be saved, the message image 152 described with a message according to a cause incapable of saving is displayed.

For example, the message image 152 shown in FIG. 3-FIG. 5 is erased (non-displayed) after being displayed for several seconds. That is, the message image 152 is displayed temporarily. Moreover, for example, the reduced image 150 is non-displayed from the game screen 100 when it is determined that the message image 152 indicating having saved the image file or being unable to save the image file is erased. Therefore, the reduced image 150 is also displayed temporarily. Therefore, although a part of the play image 100a disappears temporarily by the reduced image 150 and the message image 152, since the reduced image 150 and the message image 152 are displayed in a position not overlapping with the player character 102, it is conceivable that they do not become inconvenience (obstacle) for the player.

Figure 6:
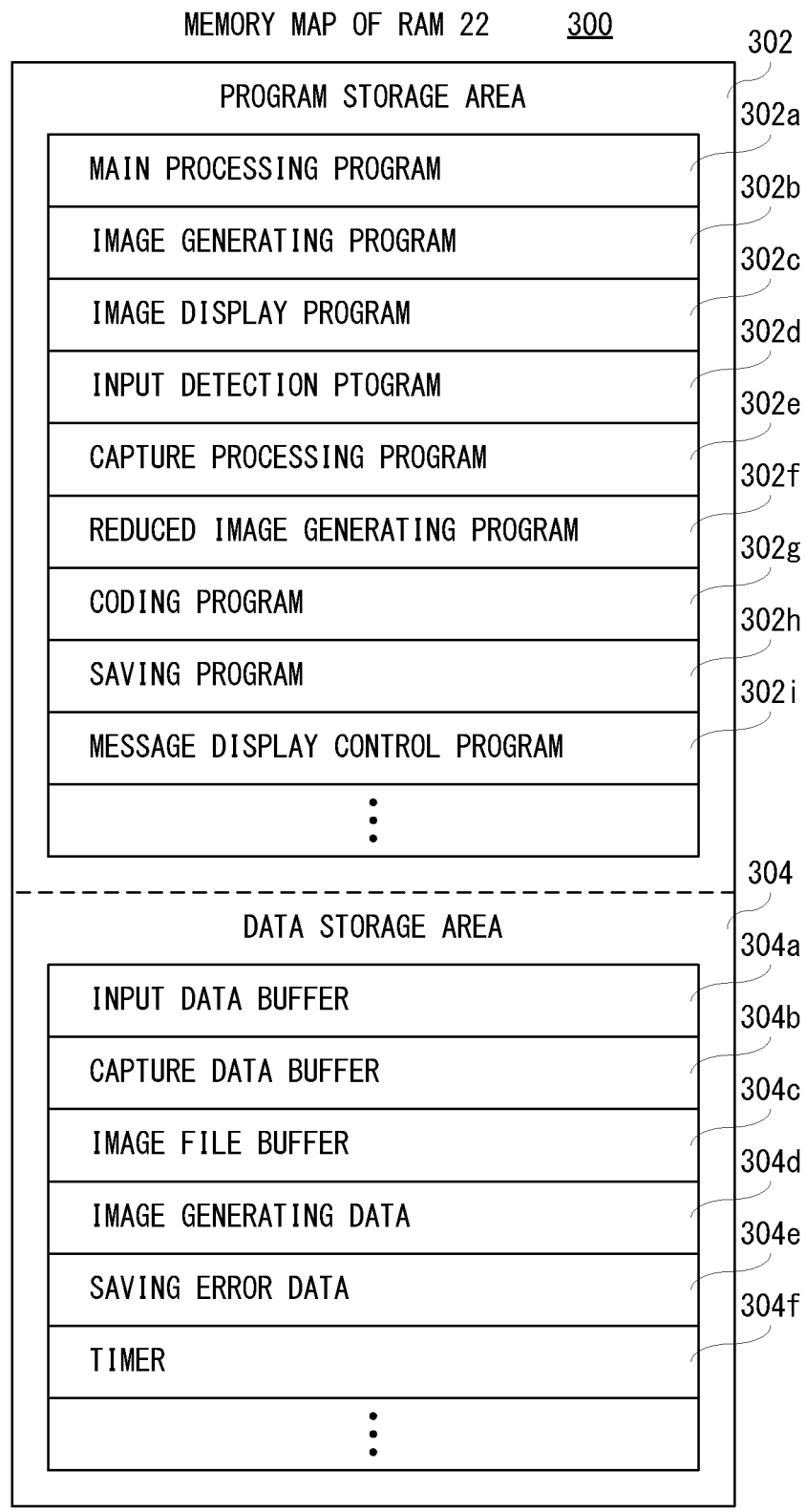
FIG. 6 is an illustration view showing a non-limiting example memory map of a RAM shown in FIG. 1.

FIG. 6 is an illustration view showing a non-limiting example memory map 300 of the RAM 22 of the game apparatus 10 shown in FIG. 1. As shown in FIG. 6, the RAM 22 includes a program storage area 302 and a data storage area 304. The program storage area 302 is stored with a program for an application of the game of this embodiment (program for game control processing), and the program for game control processing includes a main processing program 302a, an image generating program 302b, an image display program 302c, an input detection program 302d, a capture processing program 302e, a reduced image generating program 302f, a coding program 302g, a saving program 302h, a message display control program 302i, etc.

The main processing program 302a is a program for processing a main routine of the control processing of the game of this embodiment. The image generating program 302b is a program for generating image data of a game image with using image generating data 304d. For example, the image data of a game image corresponding to the game screen 100, etc. are generated.

The image display program 302c is a program for outputting the image data of the game image generated according to the image generating program 302b to the display device 36. Therefore, the game screen 100 corresponding to the image data of the game image is displayed on the display device 36.

The input detection program 302d is a program for detecting input data that is input from the input device 30 according to an operation input by the player. The detected input data is stored in an input data buffer 304a described later.

The capture processing program 302e is a program for acquiring, when the input data that is detected according to the input detection program 302d indicates capture processing (imaging processing), data of the captured image that the game screen 100 (play image 100a) is captured (captured image data). The acquired captured image data is stored in a capture data buffer 304b described later.

The reduced image generating program 302e is a program for generating image data of the reduced image 150 that is obtained, in this embodiment, by thinning-out the pixels according to a reduction rate from the captured image data that is acquired according to an operation of the player. However, the reduced image generating program 302e is executed by the GPU 32a under instructions of the CPU 20.

The coding program 302g is a program for converting the captured image data acquired according to an operation of the player in this embodiment into a predetermined format (JPEG format), and an image file of JPEG format is generated in this embodiment. The generated image file is stored in an image file buffer 304c described later.

The saving program 302h is a program for saving (writing) the image file generated according to the coding program 302g into a nonvolatile memory such as the flash memory 24. The message display control program 302i is a program for controlling display or non-display of the message image 152. However, generating of the message image 152 and display/non-display of the same are performed by the GPU 32a under instructions of the CPU 20.

Although illustration is omitted, the program storage area 302 is stored with other programs such as a communication program for communicating with other game apparatuses 10, a sound output program for generating and outputting a sound required for the game, etc.

The data storage area 304 is provided with the input data buffer 304a, the capture data buffer 304b, and the image file buffer 304c. Moreover, the data storage area 304 is stored with data such as the image generating data 304d, saved data 304e, etc. Furthermore, a timer 304f is provided in the data storage area 304.

The input data buffer 304a is an area for temporarily storing the input data from the input device 30. When received by the CPU 20, the input data is stored in the input data buffer 304a in time series, and is erased when used for the processing of the CPU 20.

The capture data buffer 304b is an area for temporarily storing the captured image data. In this embodiment, the capture data buffer 304b is set in a size capable of storing the captured image data for one screen. However, if an image file is generated from the captured image data stored in the capture data buffer 304b, this captured image data is erased.

The image file buffer 304c is an area for temporarily storing an image file of a JPEG format generated from the captured image data. In this embodiment, the image file buffer 304c is set in a size capable of storing the image file for one screen. However, if the image file stored in the image file buffer 304c is saved in the flash memory 24, this image file is erased from the image file buffer 304c. Moreover, in this embodiment, when saving the image file into the flash memory 24 is failure, the CPU 20 also erases this image file from the image file buffer 304c.

The image generating data 304d is data of polygon data, texture data, etc. for generating the image data of the play image 100a, the message image 152, etc.

Saving error data 304e is data about a saving error of the image file, and capable of identifying the content (cause) of the saving error. For example, the saving error data 304e consists of a 2-bit register. Data "00" is stored in the register when the number of saved sheets reaches up to an upper limit thereof. Moreover, data "01" is stored in the register when the memory capacity is filled. Furthermore, data "10" is stored in the register when data writing is failure during writing of the image file.

The timer 304f is a counter for counting a time period (2-3 seconds, for example) to display the message image 152, and starts a count in response to an instruction of the CPU 20. In addition, when a count is to be started, the timer 304g is reset.

Although illustration is omitted, the data storage area is stored with other data, and provided with a flag(s) and other counter(s) (timer(s)) required for the game processing (information processing).

Figure 7:
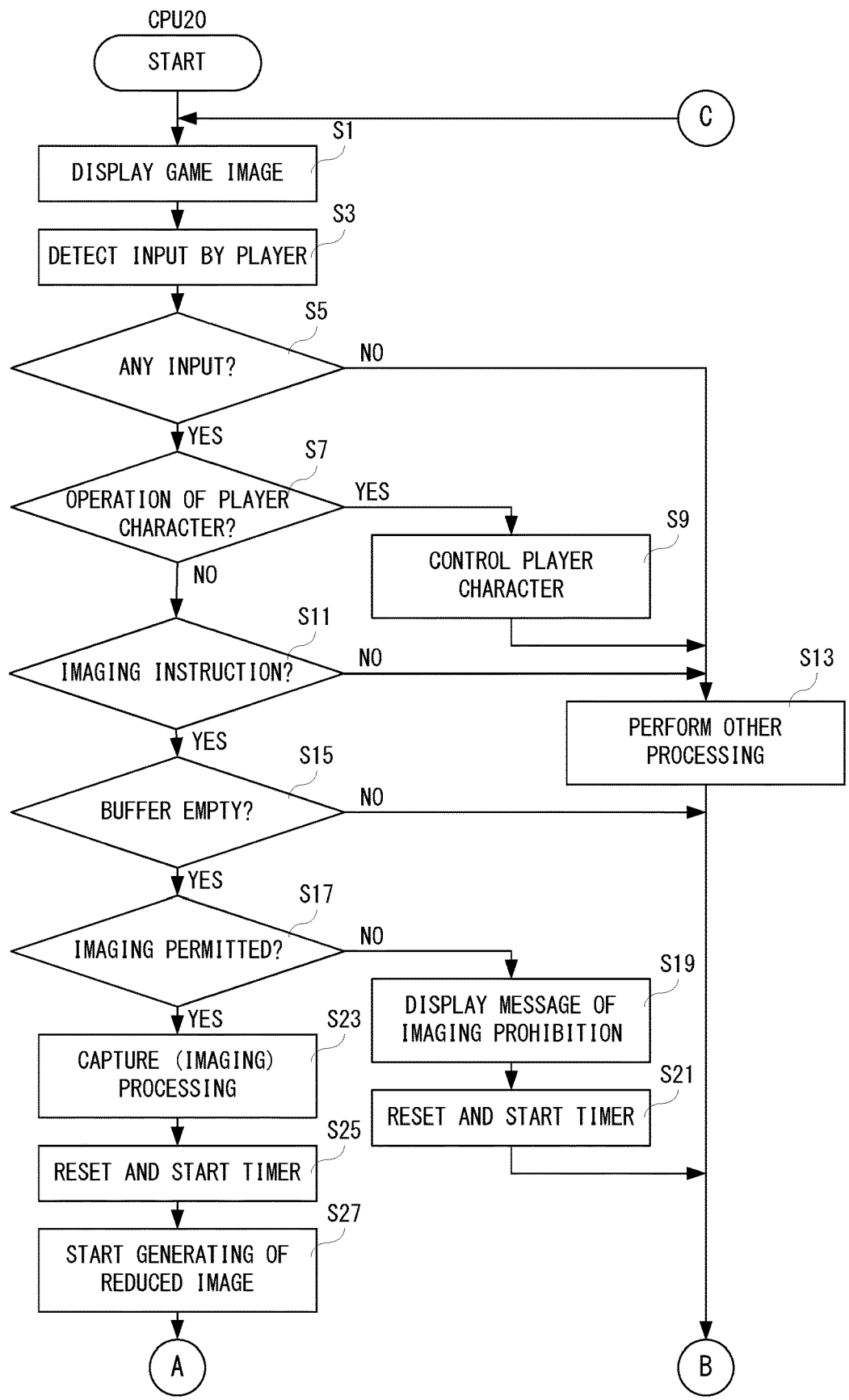
FIG. 7 is a flow chart showing a part of a non-limiting example game control processing of a CPU shown in FIG. 1.
Figure 8:
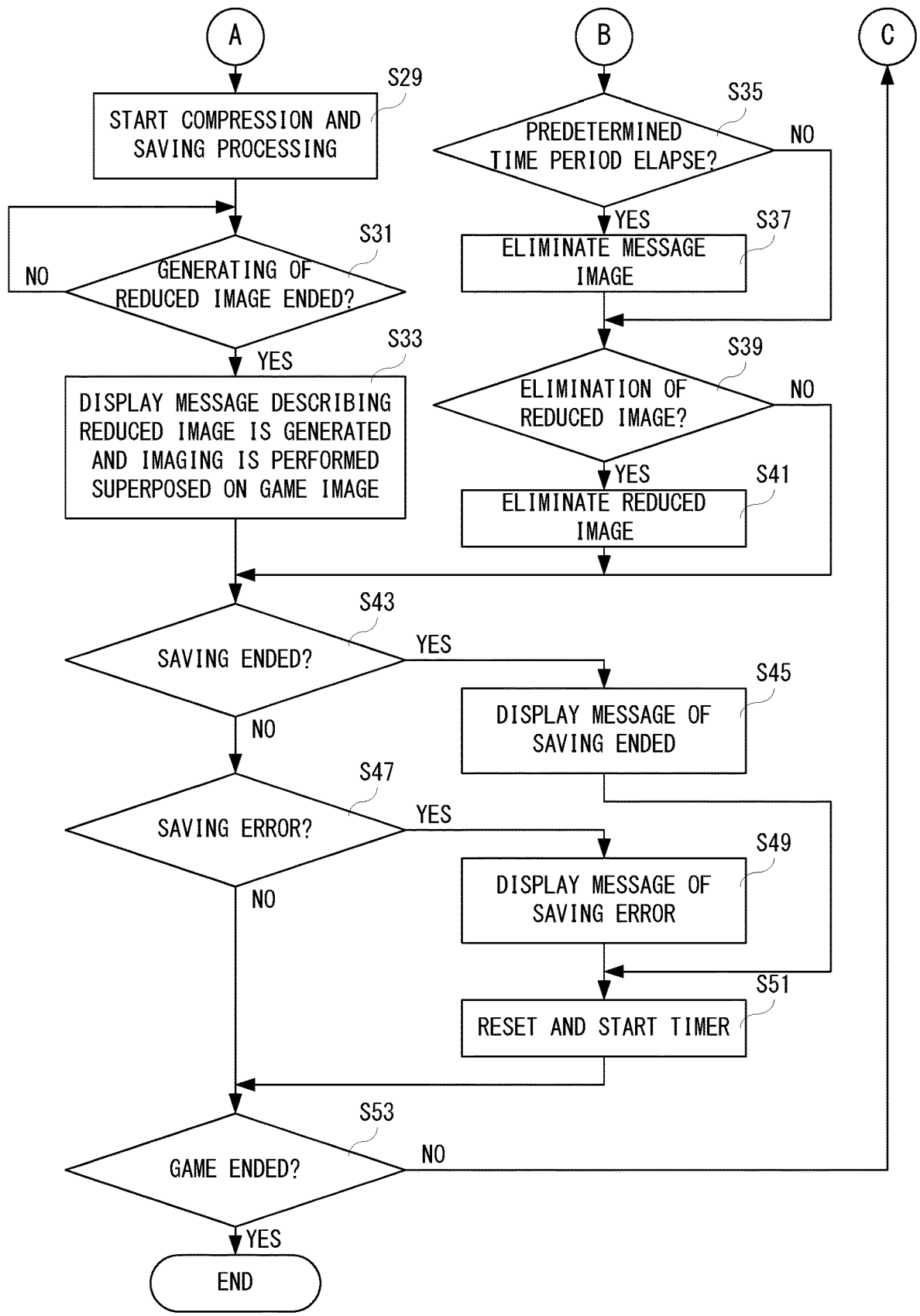
FIG. 8 is a flow chart showing another part of the non-limiting example game control processing of the CPU shown in FIG. 1, following FIG. 7.

FIG. 7 and FIG. 8 are flow charts of a non-limiting example game control processing of the CPU 20 shown in FIG. 1. As shown in FIG. 7, if the game control processing is started, the CPU 20 displays a game image in a step S1. Here, the CPU 20 controls the display driver 32 so as to display the game screen 100 as shown in FIG. 2 on the display device 36. At this time, the GPU 32a uses the image generating data 304d to generate image data of the game image corresponding to the game screen 100.

In a subsequent step S3, an input by the player is detected, and in a step S5, it is determined whether there is any input. That is, it is determined whether input data of the current frame (present frame) is stored in the input data buffer 304a. It should be noted that the frame is a screen updating unit time, and is set as 1/30 seconds or 1/60 seconds, for example.

If "NO" is determined in the step S5, that is, if there is no input, the process proceeds to a step S13. On the other hand, if "YES" determined in the step S5, that is, if there is an input, it is determined whether the input is for operation of the player character 102 in a step S7. If "YES" is determined in the step S7, that is, if the input is an input for operation of the player character 102, the player character 102 is controlled in a step S9, and then, the process proceeds to the step S13. For example, in the step S9, the CPU 20 makes, according to an operation of the player, the player character 102 move, the player character 102 attack the enemy character 104, or the player character 102 acquire or use the item 202.

Moreover, if "NO" is determined in the step S7, that is, if the input is not an input for operation of the player character 102, it is determined whether the input is an imaging instruction in a step S11. If "NO" is determined is the step S11, that is, if an imaging instruction is not determined, the process proceeds to the step S13. In the step S13, other processing is performed, and then, the process proceeds to a step S35 shown in FIG. 8. In the step S13, for example, the CPU 20 controls a movement or action of the enemy character 104, determines a game clear or game over, or makes an item appear.

Moreover, if "YES" is determined in the step S11, that is, if the input is an imaging instruction, it is determined whether the capture data buffer 304b is vacant in a step S15. As described above, since the capture data buffer 304b is an area capable of storing the captured image data for one screen, in this step S15, the CPU 20 determines whether subsequent captured image data can be stored while ending the processing that generates an image file from the captured image data of the captured image that is imaged previously (last time).

If "NO" is determined in the step S15, that is, if the capture data buffer 304b is not vacant, the process proceeds to the step S35. On the other hand, if "YES" is determined in the step S15, that is, if the capture data buffer 304b is vacant, it is determined whether imaging is permitted in a step S17.

If "NO" is determined in the step S17, that is, if imaging is not permitted, a message of imaging prohibition is displayed in a step S19, and the timer 304f is reset and started in a step S21, and then, the process proceeds to the step S35. That is, in the step S19, the CPU 20 controls the GPU 32a in order to display the message image 152 described with a message that imaging is prohibited in a manner superimposed on the play image 100a.

On the other hand, if "YES" is determined in the step S17, that is, if imaging is permitted, capturing (imaging) processing is performed in a step S23. Here, the CPU 20 controls the GPU 32a so that the image data about the play image 100a developed in the VRAM 32b is copied and the copied image data is stored as the captured image data in the capture data buffer 304b.

In a next step S25, the timer 304f is reset and started, generating of the reduced image 150 is started in a step S27, and compression and saving processing is started in a step S29 shown in FIG. 8. That is, the CPU 20 performs, during the game control processing is performed, the reduced image generating processing (see FIG. 9) and the compression and saving processing of the captured image (see FIG. 10) both described later in parallel to each other. However, the reduced image generating processing is performed by the CPU 20 and the GPU 32a.

In a next step S31, it is determined whether it is an end of the generating of the reduced image 150. Here, the CPU 20 determines whether the generating processing of the image data for the reduced image 150 is ended.

If "NO" is determined in the step S31, that is, if it is not an end of generating of the reduced image 150, the process returns to the step S31. On the other hand, if "YES" is determined in the step S31, that is, if it is an end of generating of the reduced image 150, the reduced image 150 and a message describing that the imaging is performed are displayed in a manner superimposed on the play image 100a in a step S33, and the process proceeds to a step S43. That is, in the step S33, the CPU 20 controls the GPU 32a, whereby the reduced image 150 and the message image 152 described with a message indicating that the imaging is performed are displayed in a manner superimposed on the play image 100a. Therefore, the game screen 100 as shown in FIG. 3 is displayed on the display device 36.

Moreover, in the step S35 shown in FIG. 8, it is determined whether a predetermined time period elapses. Here, the CPU 20 determines whether a count value of the timer 304f exceeds a predetermined time period (for example, 2-3 seconds). If "NO" is determined in the step S35, that is, if the predetermined time period does not elapse, the process proceeds to a step S39. On the other hand, if "YES" is determined in the step S35, that is, if the predetermined time period elapses, the message image 152 is erased (non-displayed) in a step S37, and the process proceeds to the step S39.

In the step S39, it is determined whether it is non-display of the reduced image 150. Here, the CPU 20 determines whether the message image 152 notifying that the saving of the image file is ended or that the saving of the image file is failure is non-displayed. If "NO" is determined in the step S39, that is, if it is non-display of the reduced image 150, the process proceeds to a step S43. On the other hand, if "YES" is determined in the step S39, that is, if it is non-display of the reduced image 150, the reduced image 150 is erased (non-displayed) in a step S41, and the process proceeds to the step S43.

In the step S43, it is determined whether it is an end of saving of the image file. If "YES" is determined in the step S43, that is, if it is an end of saving of the image file, a message of the end of saving is displayed in a step S45, and the process proceeds to a step S51. That is, the CPU 20 controls the GPU 32a in the step S45 to display the message image 152 described with a message indicative of the end of saving. On the other hand, if "NO" is determined in the step S43, that is, if it is not an end of saving of the image file, it is determined whether it is a saving error of the image file in a step S47. Here, it is determined whether the saving error data 304e is stored in the data storage area 304.

If "NO" is determined in the step S47, that is, if it is not a saving error of the image file, the process proceeds to a step S53. On the other hand, if "YES" is determined in the step S47, that is, if it is a saving error of the image file, a message of saving error is displayed in a step S49, and the process proceeds to a step S51. That is, the CPU 20 controls the GPU 32a in the step S49, so that the message image 152 described with a message indicating the saving error is displayed. Here, a message according to the content of the saving error indicated by the saving error data 304e is described in the message image 152. In the step S51, the timer 304f is reset and started, and the process proceeds to the step S53.

In addition, although illustration is omitted, when "YES" is determined in the step S43 or when "YES" is determined in the step S47, the CPU 20 erases the image file stored in the image file buffer 304c.

In the step S53, it is determined whether it is an end of the game. For example, the CPU 20 determines whether an end of game is instructed, or whether it becomes a game over. If "NO" is determined in the step S53, that is, if it is not an end of game, the process returns to the step S1. On the other hand, if "YES" is determined in the step S53, that is, if it is an end of game, the game control processing is terminated.

Figure 9:
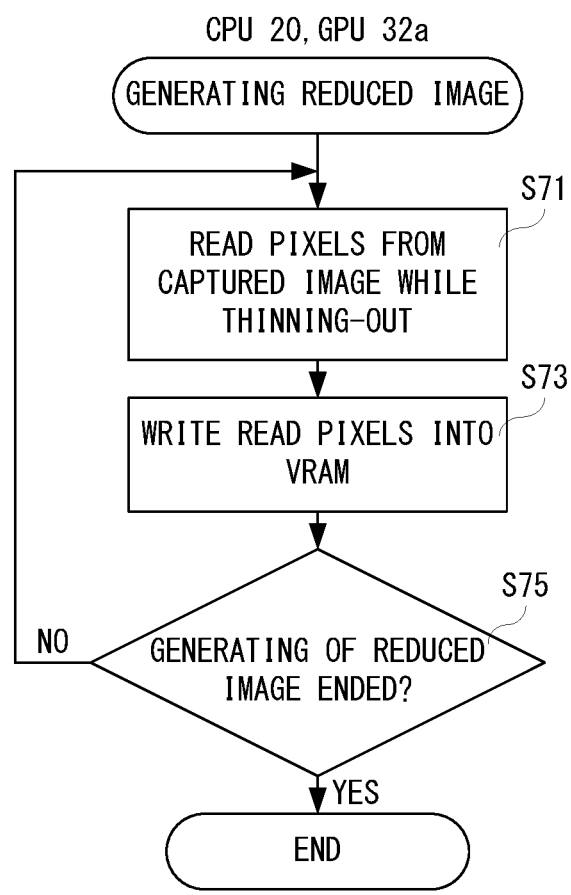
FIG. 9 is a flow chart showing a non-limiting example reduced image generating processing of the CPU and a GPU both shown in FIG. 1.

FIG. 9 is a flow chart showing a non-limiting example reduced image generating processing of the CPU 20 and the GPU 32a. As shown in FIG. 9, if the reduced image generating processing is started, the CPU 20 and the GPU 32*a* read the captured image with thinning-out pixels. Here, the CPU 20 reads the data of the pixels from the captured image data stored in the capture data buffer 304*b* with an interval of the number of pixels according to a reduction rate so as to apply to the GPU 32*a*.

In a next step S73, the read pixel is written in the VRAM 32*b*. Here, the GPU 32*a* draws (generates) on the VRAM 32*b* the image data of the reduced image 150 using the pixel data applied from the CPU 20 in an area different from an area that the image data corresponding to the game screen 100 is drawn.

Then, it is determined whether the generating of the reduced image 150 is ended in a step S75. Here, the CPU 20 determines whether reading of the data of the pixels from the captured image data is ended. If "NO" is determined in the step S75, that is, the generating of the reduced image 150 is not ended, the process returns to the step S71. On the other hand, if "YES" is determined in the step S75, that is, if the generating of the reduced image 150 is ended, the reduced image generating processing is terminated.

Figure 10:
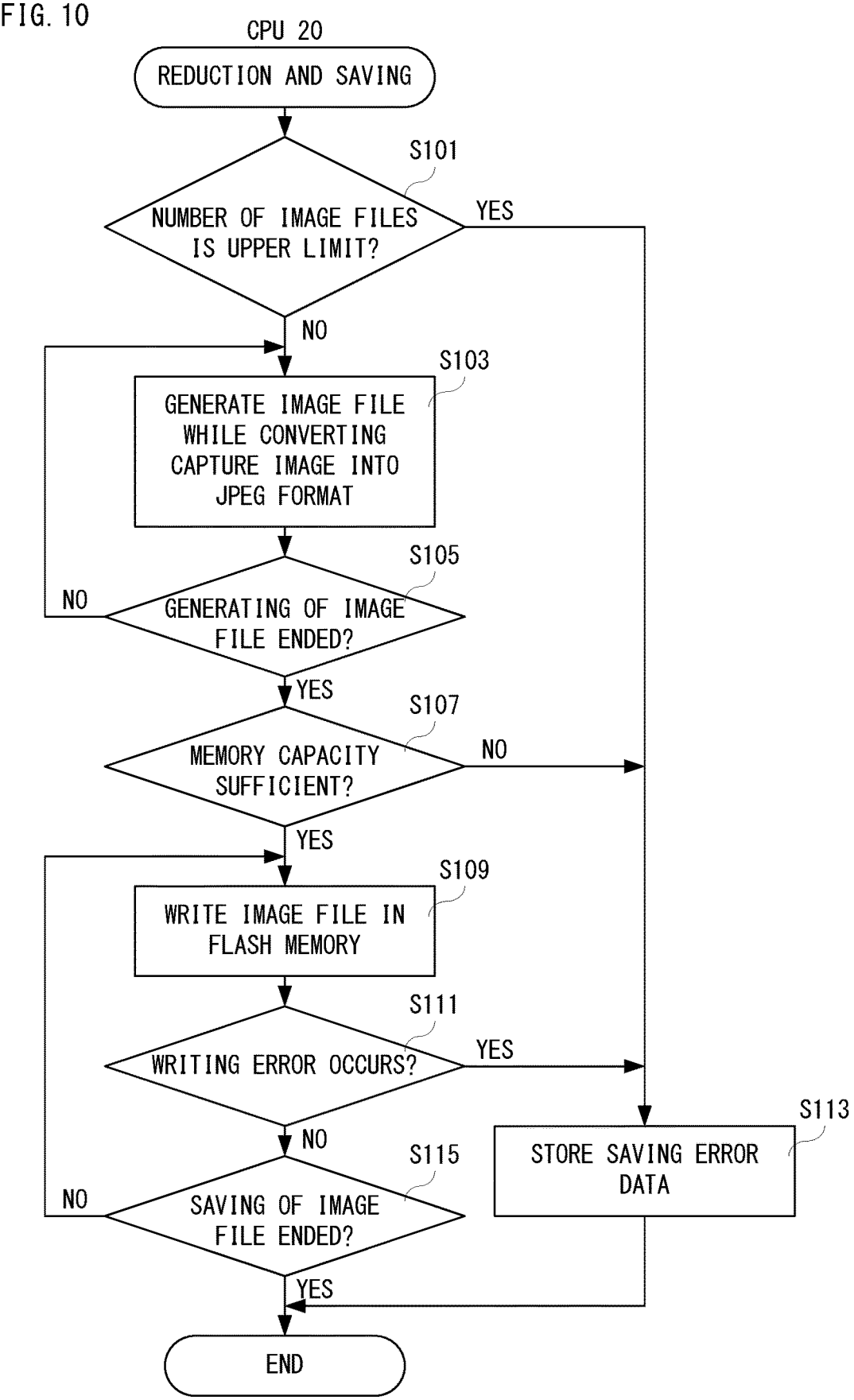
FIG. 10 is a flow chart showing a non-limiting example of compressing and saving processing of the CPU shown in FIG. 1.

FIG. 10 is a flow chart showing a non-limiting example compression and saving processing of the CPU 20. As shown in FIG. 10, if the compression and saving processing is started, the CPU 20 determines in a step S101 whether the number of image files being saved is an upper limit thereof. If "YES" is determined in the step S101, that is, if the number of the image files being saved is the upper limit, the process proceeds to a step S113 after determining that a saving error occurs.

On the other hand, "NO" is determined in the step S101, that is, if the number of the image files being saved does not reach the upper limit, in a step S103, a captured image is converted into a JPEG format to generate an image file. Then, it is determined whether generating the image file is ended in a S105. If "NO" is determined in the step S105, that is, if it is not an end of generating of the image file, the process returns to the step S103. On the other hand, if "YES" is determined in the step S105, that is, if it is an end of generating of the image file, the process proceeds to a step S107. As described above, the generated image file is stored in the image file buffer 304*c*. Moreover, although illustration is omitted, if the image file is generated, the captured image data stored in the capture data buffer 304*b* is erased.

In the step S107, it is determined whether the memory capacity of the flash memory 24 is sufficient. That is, the CPU 20 determines whether the memory capacity capable of storing the generated image file remains in the flash memory 24. If "NO" is determined in the step S107, that is, if the memory capacity of the flash memory 24 is insufficient, the process proceeds to a step S113 after determining as a saving error. On the other hand, if "YES" is determined in the step S107, that is, if the memory capacity of the flash memory 24 is sufficient, the image file is written in the flash memory 24 in a step S109.

In a next step S111, it is determined whether a writing error occurs. If "YES" is determined in the step S111, that is, if a writing error occurs, the process proceeds to the step S113 after determining as a saving error. In the step S113, the saving error data 304*e* according to the content of the saving error is stored in the data storage area 304, and the compression and saving processing is terminated.

On the other hand, if "NO" is determined in the step S111, that is, if a writing error does not occur, it is determined whether the saving of the image file is to be ended in a step S115. If "NO" is determined in the step S115, that is, if it is an end of saving of the image file, the process returns to the step S109. On the other hand, if "YES" is determined in the step S115, that is, if it is an end of saving of the image file, the compression and saving processing is terminated.

According to this embodiment, if the game screen is captured during the game play, first processing that generates and displays the reduced image and a second processing that saves the image file in the memory by converting a data format of the captured image are performed in parallel to the game control processing, and therefore, it is possible to visually confirm the captured image immediately after a capture instruction is input without suspending the game by seeing the reduced image.

In addition, the captured image is saved in the flash memory while converting the image file by compressing the captured image with the JPEG format, and this is because the memory capacity is to be effectively used, and therefore, for example, when it is not necessary to consider the memory capacity, the captured image may be saved in the flash memory without being compressed.

In addition, although the capture data buffer is set to have a capacity capable of storing the captured image data for one screen in this embodiment, the capture data buffer may be set to have a capacity capable of storing the captured image data for a plurality of screens. When the captured image data for a plurality of screens can be stored, it is possible to image the captured images continuously of the possible number of screens (sheets). However, the captured image data is converted into the image file in accordance with an order of imaging, and saved in the flash memory in accordance with an order of conversion.

Moreover, although the reduced image is generated from the captured image in this embodiment, it does not need to be limited to this. If a JPEG image file is generated in a format called DCF (Design rule for Camera File system) of a digital camera, image data of a thumbnail image is also generated at a time that the JPEG image file (compression data of the captured image) is generated. Therefore, replacing with the reduced image, it is possible to display a thumbnail image, and save an image file in parallel to this into a flash memory. Also in this case, since a thumbnail image is displayed without waiting for saving of the image file, it is possible to display quickly the image being captured in comparison with a case where a thumbnail image is displayed after ending of saving. Moreover, if using a CPU with high processing ability or using a dedicated component (JPEG codec) for generating and regenerating (demodulating) a JPEG image file, it is possible to relatively shorten the time until the captured image can be visually confirmed after a capture instruction is input.

Furthermore, although the image file is saved into the flash memory that is incorporated in the game apparatus in this embodiment, it does not need to be limited to this. For example, the image file may be saved into an external memory. Moreover, when the image file cannot be saved into a flash memory, it may be saved into an external memory. Inversely, when the image file cannot be saved into an external memory, it may be saved into a flash memory.

It should be noted that the content of the game, the structure of the game apparatus and the specific numerical values described in the above-described embodiments are only examples, should not be limited and to be set appropriately in accordance with the actual products.

Furthermore, when the same or similar effect (result) is obtained, an order of the steps shown in the flowchart may be changed suitably. For example, the steps S39 and S41 may be performed between the step S51 and the step S53.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored therein one or more information processing programs executable by one or more processors of an information processing apparatus, wherein
the one or more information processing programs causes the one or more processors to:
execute an application which includes displaying an image;
display the image;
receive an input by a user;
determine a type of the input;
in response to the type of the input being a first input, execute the application based on the input; and
in response to the type of the input being a second input,
acquire the image; and
generate a reduced image of the acquired image,
wherein the application is executed at the same time as compressing the acquired image for storage and generating the reduced image, and
wherein the generated reduced image is superimposed on the image.

2. The storage medium according to the claim 1, wherein the reduced image is generated by performing thinning-out pixels from the acquired image at a reduction rate.

3. The storage medium according to the claim 1, wherein the acquired image is stored in a temporarily storing memory, and the acquired image stored in the temporarily storing memory is transferred to a saving memory.

4. The storage medium according to the claim 3, wherein the temporarily storing memory has a storage area configured to store a plurality of acquired images, and
when a plurality of acquired images are stored in the temporarily storing memory, each of the plurality of acquired images is saved in the saving memory in an order of being stored in the temporarily storing memory.

5. The storage medium according to the claim 1, wherein the one or more information processing programs further causes the one or more processors to cause a generation of an error message superimposed on the image when the acquired image cannot be saved in a saving memory.

6. The storage medium according to the claim 1, wherein the reduced image is superimposed on a part of the image.

7. The storage medium according to the claim 1, wherein the reduced image is superimposed on an upper end portion of the image.

8. The storage medium according to the claim 1, wherein the image includes a predetermined object that is at least moved according to the input, when the input is the first input, and the reduced image is superimposed on a position not overlapping with the predetermined object.

9. The storage medium according to the claim 1, wherein the reduced image is displayed until an event occurs.

10. The storage medium according to the claim 1, wherein the second input is an operation to a push button provided in an operating device.

11. The storage medium according to the claim 1, wherein the information processing program further causes the one or more processors to execute saving the acquired image compressed for the storage, wherein
generating the reduced image takes less time than compressing the acquired image and saving the acquired image compressed for the storage.

12. The storage medium according to the claim 1, wherein the application further includes game processing, wherein the one or more processors display the reduced image superimposed on the image at the same time as receiving a new input by a user, and
the information processing program further causes the one or more processors to execute the game processing according to the input, when the type of the input is the first input.

13. The storage medium according to the claim 1, wherein the generating of the reduced image takes less time than the compression.

14. A non-transitory computer-readable storage medium having stored therein one or more information processing programs executable by one or more processors of an information processing apparatus, wherein
the one or more information processing programs causes the one or more processors to:
execute an application which includes displaying an image;
display the image;
in response to receiving a predetermined input, acquire the image;
generate a reduced image of the acquired image;
display the reduced image superimposed on the image; and
save, in parallel to displaying the reduced image, the acquired image in a saving memory through data conversion thereof, wherein the generating of the reduced image and the application is executed at the same time.

15. An information processing apparatus comprising one or more processors:
the one or more processors being configured to:
execute an application including displaying an image;
display the image;
receive an input by a user;
determine a type of the input;
in response to the type of the input being a first input, execute the application based on the input; and
in response to the type of the input being a second input,
acquire the image; and
generate a reduced image of the acquired image,
wherein the application is executed at the same time as compressing the acquired image for storage and generating the reduced image,
wherein the generated reduced image is superimposed on the image.

16. An information processing method executable by an information processing system, the method comprising:
executing an application which including displaying an image;
displaying the image;
receiving an input by a user;
determining a type of the input;
in response to the type of the input being a first input, executing the application based on the input;
in response to the type of the input being a second input, acquiring the image; and
generating a reduced image of the acquired image, wherein the application is executed at the same time as compressing the acquired image for storage and generating the reduced image, wherein the generated reduced image is superimposed on the image.

17. A non-transitory computer-readable storage medium having stored therein an information processing program executable by one or more processors of an information processing apparatus, wherein the information processing program causes the one or more processors to execute:

displaying an image;

receiving an input by a user;

determining a type of the input;

in response to the type of the input being a first input, updating the image based on the input;

in response to the type of the input being a second input, acquiring the image;

generating a reduced image of the acquired image; and displaying the reduced image superimposed on the image at the same time as receiving a new input by a user and updating the image based on the new input, when the type of the new input is the first input.

* * * * *